United States Patent
Wiegman et al.

(10) Patent No.: US 7,521,902 B2
(45) Date of Patent: Apr. 21, 2009

(54) POWER BALANCING OF MULTIPLE SYNCHRONIZED GENERATORS

(75) Inventors: Herman Wiegman, Niskayuna, NY (US); Luis Jose Garces, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 11/943,371

(22) Filed: Nov. 20, 2007

(65) Prior Publication Data

US 2008/0073979 A1    Mar. 27, 2008

Related U.S. Application Data

(62) Division of application No. 11/303,726, filed on Dec. 16, 2005, now Pat. No. 7,319,307.

(51) Int. Cl.
*H02J 3/40* (2006.01)
*F02B 63/04* (2006.01)
*H02P 9/00* (2006.01)

(52) U.S. Cl. .............................. 322/14; 322/44; 322/17

(58) Field of Classification Search ................ 290/4 A, 290/4 C; 310/112, 114; 322/7, 19, 62, 14
See application file for complete search history.

(56) References Cited

U.S. PATENT DOCUMENTS

| | | | |
|---|---|---|---|
| 1,699,128 A | 1/1929 | Warren | |
| 2,008,506 A | 7/1935 | Kieser | |
| 2,465,826 A | 3/1949 | Wolf et al. | |
| 4,460,834 A * | 7/1984 | Gottfried | 307/64 |
| 4,757,249 A | 7/1988 | Farber et al. | |
| 5,083,039 A * | 1/1992 | Richardson et al. | 290/44 |
| 5,434,454 A | 7/1995 | Farkas | |
| 5,646,458 A | 7/1997 | Bowyer et al. | |
| 5,973,481 A * | 10/1999 | Thompson et al. | 322/7 |
| 6,218,813 B1 * | 4/2001 | Davis | 322/20 |
| 6,653,821 B2 | 11/2003 | Kern et al. | |
| 7,161,257 B2 * | 1/2007 | Lakov et al. | 290/40 R |
| 2005/0012339 A1 | 1/2005 | Mikhail et al. | |
| 2006/0004531 A1 | 1/2006 | Ye et al. | |
| 2006/0119325 A1 * | 6/2006 | Mrowiec et al. | 322/22 |

FOREIGN PATENT DOCUMENTS

| | | |
|---|---|---|
| GB | 871056 | 6/1961 |
| GB | 2101691 | 1/1983 |
| WO | WO2006/010190 | 2/2006 |

* cited by examiner

*Primary Examiner*—Julio C. Gonzalez
(74) *Attorney, Agent, or Firm*—Penny A. Clarke

(57) ABSTRACT

Power balancing techniques for a synchronous power generation system are provided. One exemplary method for balancing power in a synchronous generator system includes determining an output power characteristic of a synchronous generator driven by a prime mover and comparing the characteristic to a value derived from the output power of a plurality of synchronous generators. The method also includes providing a correction signal to the synchronous generator to modify the output power produced by that generator. A synchronous power generation system having a plurality of synchronous generators driven by a common prime mover is also provided.

18 Claims, 7 Drawing Sheets

POWER BALANCING OF MULTIPLE SYNCHRONIZED GENERATORS

CROSS REFERENCE TO RELATED APPLICATION

This application is a divisional of U.S. patent application Ser. No. 11/303,726, entitled "Power Balancing of Multiple Synchronized Generators," filed Dec. 16, 2005, which is hereby incorporated by reference.

BACKGROUND

The present invention generally relates to electrical power generation systems. More particularly, the present invention relates to a technique for adjusting power output by each of a plurality of electrical generators driven by a single prime mover.

Electrical power generation systems are employed in a number of diverse applications, including aviation, manufacturing, and commercial energy production, to name just a few. As will be appreciated, these systems are generally adapted to convert mechanical power to electrical power that may be used to operate one or more electrical devices or systems requiring such power. Generally, these power generation systems include one or more generators, each generator having a stator and a rotor that rotates with respect to the stator. Such power generation systems also typically include one or more prime movers that supply mechanical power to the rotors. In the case of aviation, for example, prime movers are often gas turbine engines of an aircraft. In some generators, a magnetic field is projected from rotor poles within the rotor and the rotation of the rotor and the magnetic field induces alternating electrical current in the windings of the stator that may be used to power electrical devices. While many generators are produced in which the rotor is configured to rotate within the stator, one skilled in the art will also appreciate that generators may be configured to allow the rotor to rotate about an interior stator.

In the case of a power generation system having multiple generators, it may be desirable to control or balance the electrical power contribution of each generator, including its real and reactive components. Often, when such control is envisaged, a power generation system will include a separate prime mover that provides mechanical power to each generator. The use of independent prime movers for each generator allows the power output to be controlled via adjustment to the applied power of the prime mover and the relative phase angle of the alternating power between the generators. While the coupling of a single generator to a prime mover may be adequate for certain uses, such an arrangement has limitations. For instance, an aircraft includes a finite number of prime movers to drive electrical generators. If the aircraft included two gas turbine engines, only two electrical generators connected to the same grid could be driven by the turbines. If additional generators were needed, it would be possible to couple additional generators to a prime mover. However, as will be appreciated, the coupling of multiple generators to a single prime mover would preclude control of the power output by the generators via adjustments to the common prime mover or the mechanically coupled and non-adjustable phase angles of the generators. Further, the inability to make such adjustments aversely impacts the power rating of a given power generation system.

There exists, therefore, a need for an improved power balancing and adjustment technique that would allow independent adjustment of output power, both real and reactive components, produced by each of a plurality of generators driven by a common prime mover.

BRIEF DESCRIPTION

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

Embodiments of the present technique generally relate to synchronous power generator systems and methods for balancing individual power outputs, including balancing the real, reactive, or apparent forms of these outputs, between generators within such systems. Certain embodiments of the presently disclosed technique facilitate balancing of power between multiple generators and independent adjustment of the output power produced by one of a plurality of generators driven by a single prime mover. In some embodiments, such as if the generators are of the same rating, balancing may be performed in order to equalize the output power of each generator of the plurality such that the output power produced by a single generator closely approximates the average output power of each generator of the plurality. However, in other embodiments, power balancing may be performed to establish a first output power from one generator driven by a prime mover and to establish a second, different, output power from another generator driven by the same prime mover.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present technique will be described below. In an effort to provide a concise description of these embodiments, not all features of an actual implementation are described in the specification. It should be appreciated that in the development of any such actual implementation, as in any engineering or design project, numerous implementation-specific decisions will be made to achieve the developers' specific goals, such as compliance with system-related and business-related constraints, which can vary from one implementation to another. Moreover, it should be appreciated that such a development effort can be complex and time consuming, but would remain a routine undertaking of design, fabrication, and manufacture for those of ordinary skill having the benefit of this disclosure. It should be noted that illustrated embodiments of the present technique throughout this text represent a general case.

Figure 1:
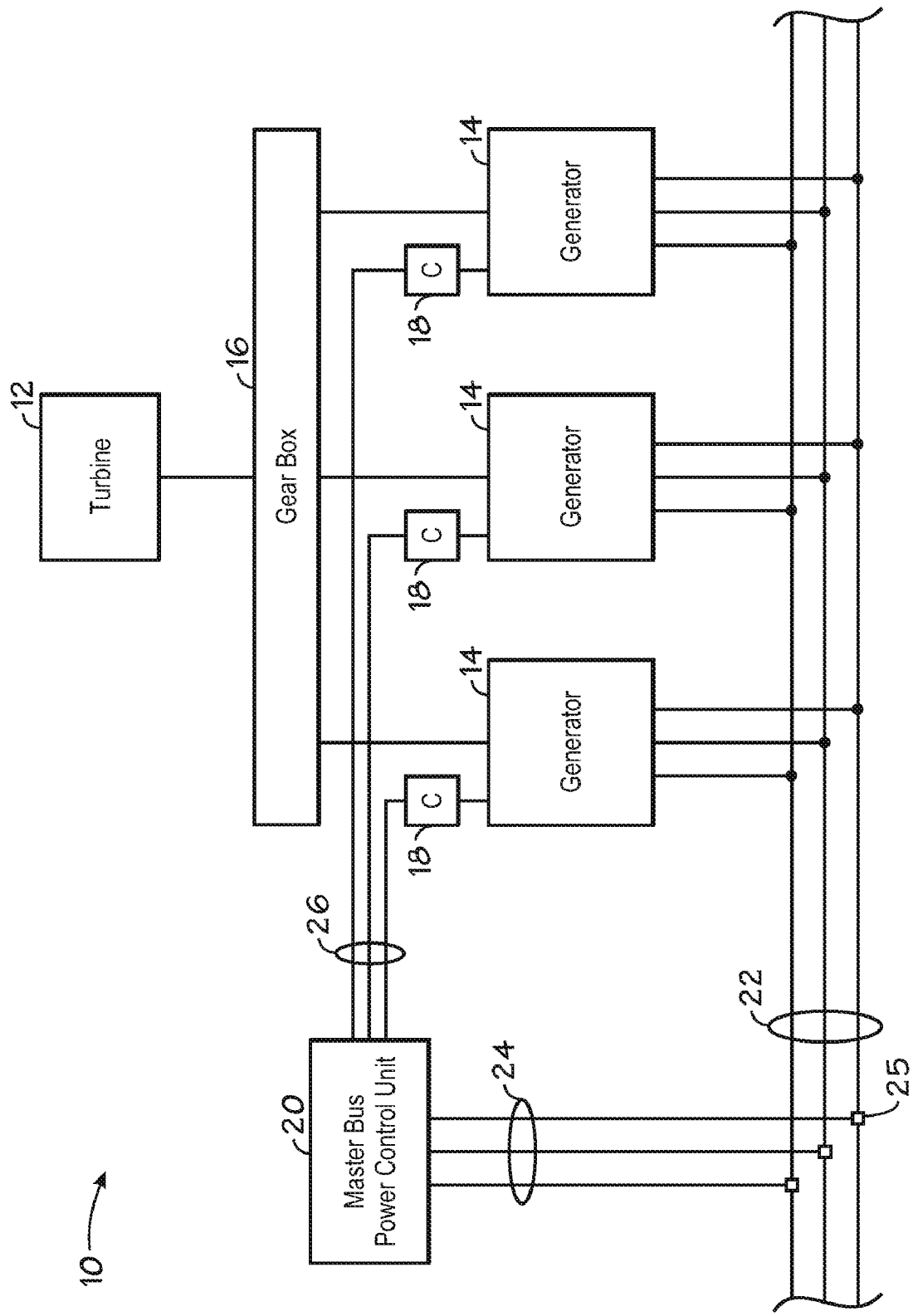
FIG. 1 is a block diagram illustrating an exemplary power generation system having a plurality of synchronous generators in accordance with one embodiment of the present technique.

Turning now to the figures, a block diagram illustrating an exemplary power generation system 10 in accordance with one embodiment of the present technique is provided in FIG. 1. The system 10 includes a plurality of synchronous generators 14 coupled to and driven by a single prime mover, such as turbine 12. Particularly, turbine 12 provides mechanical power to generators 14 via a mechanical power divider, such as gear box 16. As will be appreciated by one skilled in the art, generators 14 convert the mechanical input power received from turbine 12 via gear box 16 to electrical output power. As will be appreciated, the generators 14 may have equivalent or different power ratings in various embodiments.

The system 10 also includes field control units 18, each of which is associated with a generator 14, and a master bus power control unit 20 coupled to the field control units 18. The power output by generators 14 is transmitted to an output bus 22 that may provide power to a variety of other electrical devices or systems. A feedback bus 24 receives signals from sensors 25 coupled to the output bus 22, and transmits these signals to master bus power control unit 20. As explained in greater detail below, master bus power control unit 20 utilizes this information and applies correction or adjustment signals to the field control units 18 via a control bus 26 to regulate the active (i.e., real) and reactive power output by each generator in an independent fashion.

It should be noted that the present system might find a wide range of uses and applications. For instance, the present system may be advantageously employed in connection with an aircraft electrical system. However, other implementations are also envisaged, including use in the oil and gas industry, ship power generation, directed energy defense systems, and radar systems, to name a few. Further, it will be appreciated that, although the present exemplary system 10 includes three synchronous generators of the same ratings, other systems may include a different number of generators, such as six, eight, or the like. Indeed, any systems including a plurality of generators may be employed in full accordance with the present technique. Still further, while the present embodiment includes three generators providing output power to a single output bus 22, other embodiments may include multiple output busses that separately and independently receive output power from several sub-groupings of generators. Additionally, one or more generators 14 may have loads attached to them independent of output bus 22. In such an instance, the field control units 18 provide local control for independent operation of a generator 14, while the master bus power control unit 20 facilitates parallel operation of the generators.

Figure 2:
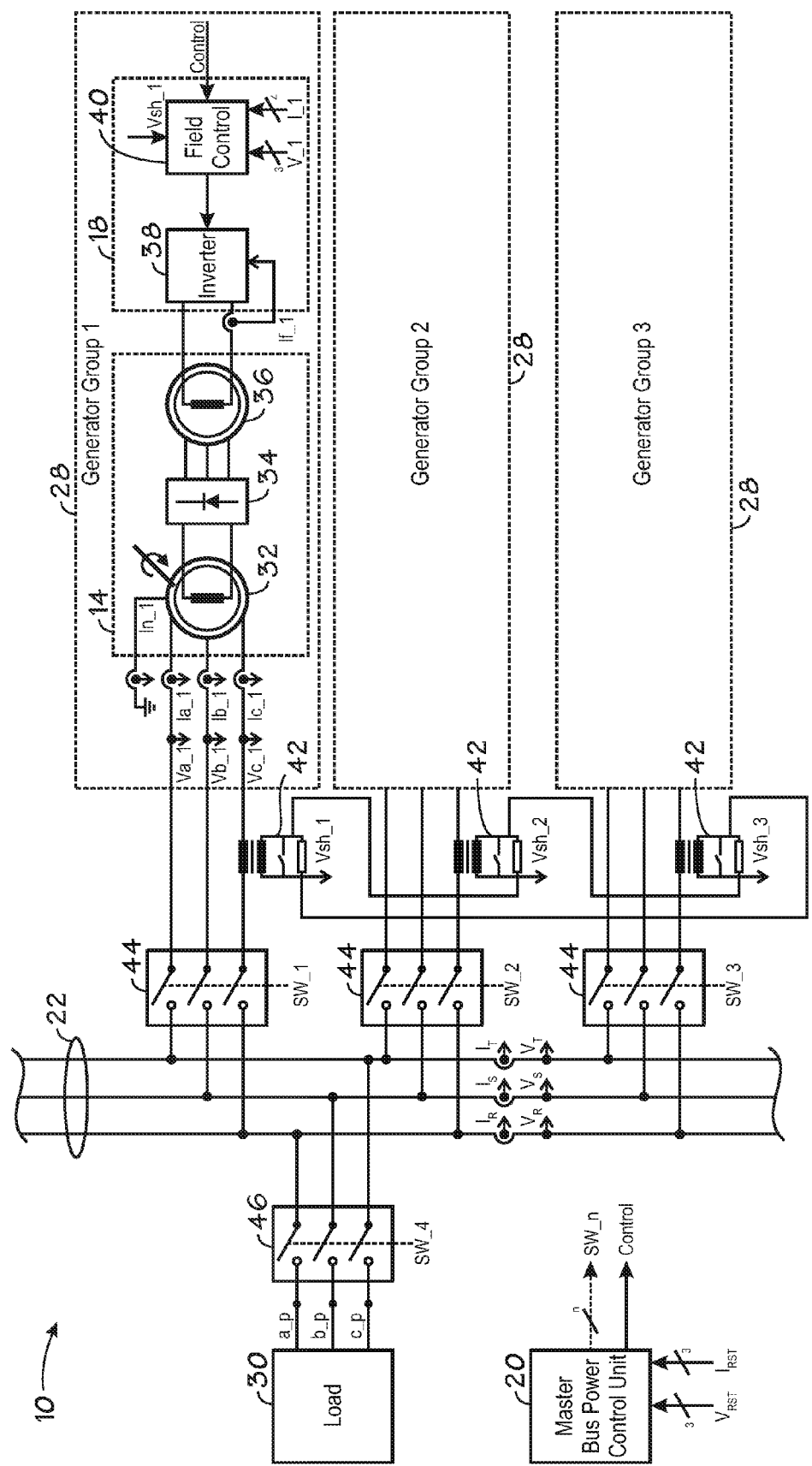
FIG. 2 is a block diagram illustrating additional details and components of the generators and the power system provided in FIG. 1 in accordance with one embodiment of the present technique.

Additional details of the exemplary system 10 may be more clearly described and understood with reference to FIG. 2. Notably, system 10 includes a plurality of generator groups 28, each of which includes a generator system 14 and a field control unit 18. The generator groups 28 produce electrical power that may be used to operate numerous devices or systems, such as load 30. In the illustrated embodiment, generator system 14 includes a generator 32, a rotating rectifier 34, and an exciter 36. The generator groups 28 may be one of a number of various generator types, including a brushless excited synchronous generator, a wound field synchronous generator, a synchronous generator with an excitation circuit, a homo-polar synchronous generator, to name but a few.

Further, each field control unit 18 includes an inverter 38 and a field controller 40. Each field controller 40 is configured to receive various input signals and to produce an output signal that controls a brushless exciter 36. As will be appreciated, the control unit 18 can increase or decrease back EFM on the exciter coil to control internal field strength and output power produced by generator 32. Characteristics of the output power produced by generator 32 are sensed via voltage sensors Va, Vb, and Vc, and current sensors Ia, Ib, Ic, and In. These sensed characteristics may then be input to field controller 40. The field controller 40 is also configured to receive a control signal, which may include a status signal and a correction signal as discussed in greater detail below, from master bus power control unit 20 and a shunt voltage Vsh from a sensor 42. Sensors 42 measure AC current produced by generator groups 28 and detect current imbalance between these groups. This information may be input to either or both of master bus power control unit 20 and the field controllers 40 to facilitate application of a correction or command signal to reduce such an imbalance. The field controller 40 processes these signals to generate a command signal to adjust the power output of generator 32.

The power output by each generator group 28 is supplied to the output bus 22, as discussed above. The characteristics of the aggregate power transmitted over the bus, including $I_R$, $I_S$, $I_T$, $V_R$, $V_S$, and $V_T$, are sensed and input to master bus power control unit 20. As discussed below, the power control unit 20 generates a status or control signal that is applied to each field controller 40. Further, the power control unit 20 may also output a control signal to one or more protective circuits, such as switches 44 and 46.

Figure 3:
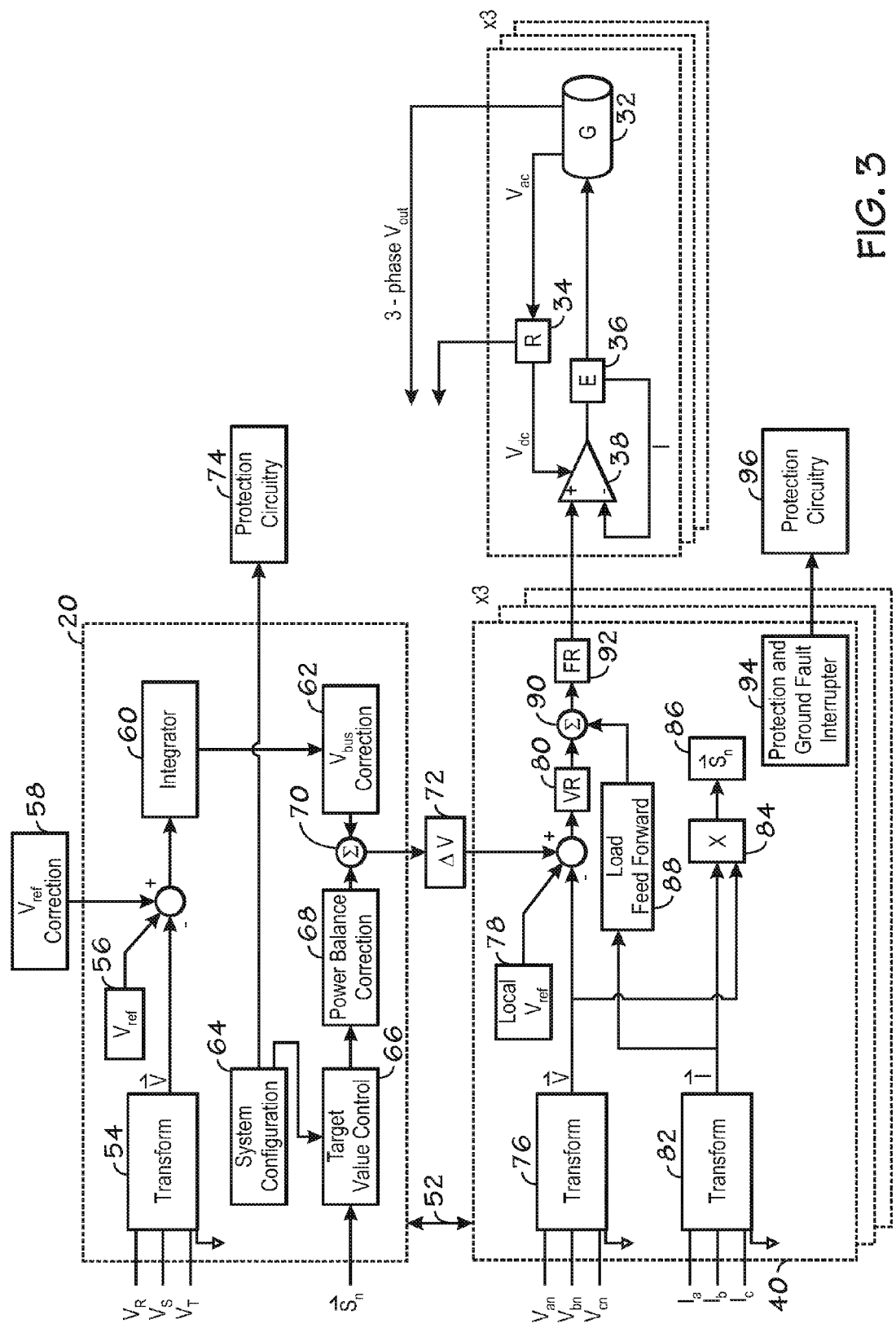
FIG. 3 is a block diagram illustrating further exemplary details with respect to control units depicted in FIGS. 1 and 2.

Further details of master bus power control unit 20 and field controllers 40 are illustrated in FIG. 3 in accordance with one embodiment of the present technique. Various signals described above are communicated between master bus power control unit 20 and field controllers 40 via a communication link 52. The voltage from output bus 22 is input to master bus power control 20 and transformed, as indicated in block 54. This transformed voltage is combined with a reference voltage 56 and a reference voltage correction factor 58, which are input into an integrator circuit 60. In one embodiment, reference voltage 56 is 115 Vrms, however, other voltages may be utilized in accordance with the present techniques. Integrator 60 outputs a bus voltage correction factor 62 which is combined with a power balance correction factor 68, as described below.

A system configuration module 64 may receive or contain configuration data regarding the generators and the buses. For instance, the system configuration module 64 may include the status of the various generators, such as which generators are active or inactive, and which are running in parallel or in an independent fashion, for example. As discussed below, a generator may be removed from parallel operation due to loading issues or operating error, to operate independently from other generators, or for other reasons. A target value control module 66 receives data from system configuration module 64, as well as the apparent power from each generator 32, and provides a power balance correction factor 68 for each generator. System configuration module 64 may also output a signal to various protection circuitries 74, which may include switches 44 and 46, to activate or deactivate the power generation system 10 or individual generator groups 28 or the system.

In some embodiments, it may be desirable to equalize the power generated by each generator 32. In such embodiments, a power balance correction factor 68 is provided to each generator 32, based on the difference between or deviation of the actual output power of each generator 32 from the desired output power of that generator, to reduce or increase the power output by that generator in order to more closely conform with the average power output of all generators 32 in parallel operation. As will be appreciated, each power balance correction factor 68 is based on the particular output characteristics of that generator. A generator 32 that is outputting power of a greater magnitude than the average of a group of generators may result in application of a power balance correction factor 68 that effects a reduction in the output power produced by that particular generator. Likewise, a generator 32 that is producing less power than the group average could receive a power balance correction factor 68 that results in an increase in the power output of that generator. In other embodiments, it may be desirable to operate one generator 32 to produce output power that is higher or lower than that produced by the other generators 32. In these embodiments, a power balance correction factor 68 is applied to each generator 32 to reduce deviation of the output power of each generator 32 from the desired output power level for that generator.

Each power balance correction factor 68 and the bus voltage correction factor 62 are combined, as indicated in summation block 70, to produce a correction command signal or factor 72 for the respective generator 32. The correction or adjustment signal 72 is input from the master bus power control unit 20 to a field controller 40, and combined with a transformed output voltage, as indicated in block 76, and a local reference voltage 78. This combined signal may then be fed to a voltage regulator 80.

Additionally, output current of a particular generator 32 is input to its respective field controller 40 and transformed as indicated in block 82. A processing block 84 receives both the transformed voltage and transformed current to calculate the apparent power 86 of the generator 32, which is input to the target value control module 66, as described above. The input of the updated apparent power of each generator 32 to target value control module 66 facilitates the comparison of the output power of each generator 32 to a desired level, such as an average level. Further, it allows for simultaneous or near-simultaneous correction or adjustment of each individual output power via a correction or adjustment signal 72.

The transformed current may also be used to provide a load feed forward signal 88 that is combined with an output signal from voltage regulator 80 to improve its dynamic performance at summation block 90. The combined signal may be output from block 90 to a field regulator 92. As will be appreciated, voltage regulator 80 and field regulator 92 may also include various error compensation or integration techniques that may be desirable for a given application. It should be noted that, in certain embodiments, field controllers 40 may also include protection and ground fault interrupter modules 94 to control various protection circuitry 96 of the system 10.

A signal from each field regulator 92 is transmitted from field controller 40 to an inverter 38 associated with a respective generator 32. As will be appreciated, the output of inverter 38 affects the back EMF on exciter coil 36 that, in turn, affects the output power of generator 32. Thus, the signal output from field controller 40 to the inverter 38 directly impacts the output power of each generator 32. Further, feedback is provided from exciter 36 to inverter 38 for closed loop control of the magnetic field.

The present techniques allow for balancing of various power characteristics, including real power, reactive power, and apparent power. The balancing of power output by each of several generators may be made clear with reference to FIGS. 4-7. Notably, these figures illustrate graphs depicting the output power of several exemplary generators. As will be appreciated, the apparent power of a generator is the vector sum of a real or active power component and a reactive power component. In the graphs of FIGS. 4-7, the real power produced by the exemplary generators is measured along the horizontal axis, while the reactive power is measured along the vertical axis. The resulting apparent power is represented by the length of the vectors 108, 110, and 112 in FIG. 4.

Figure 4:
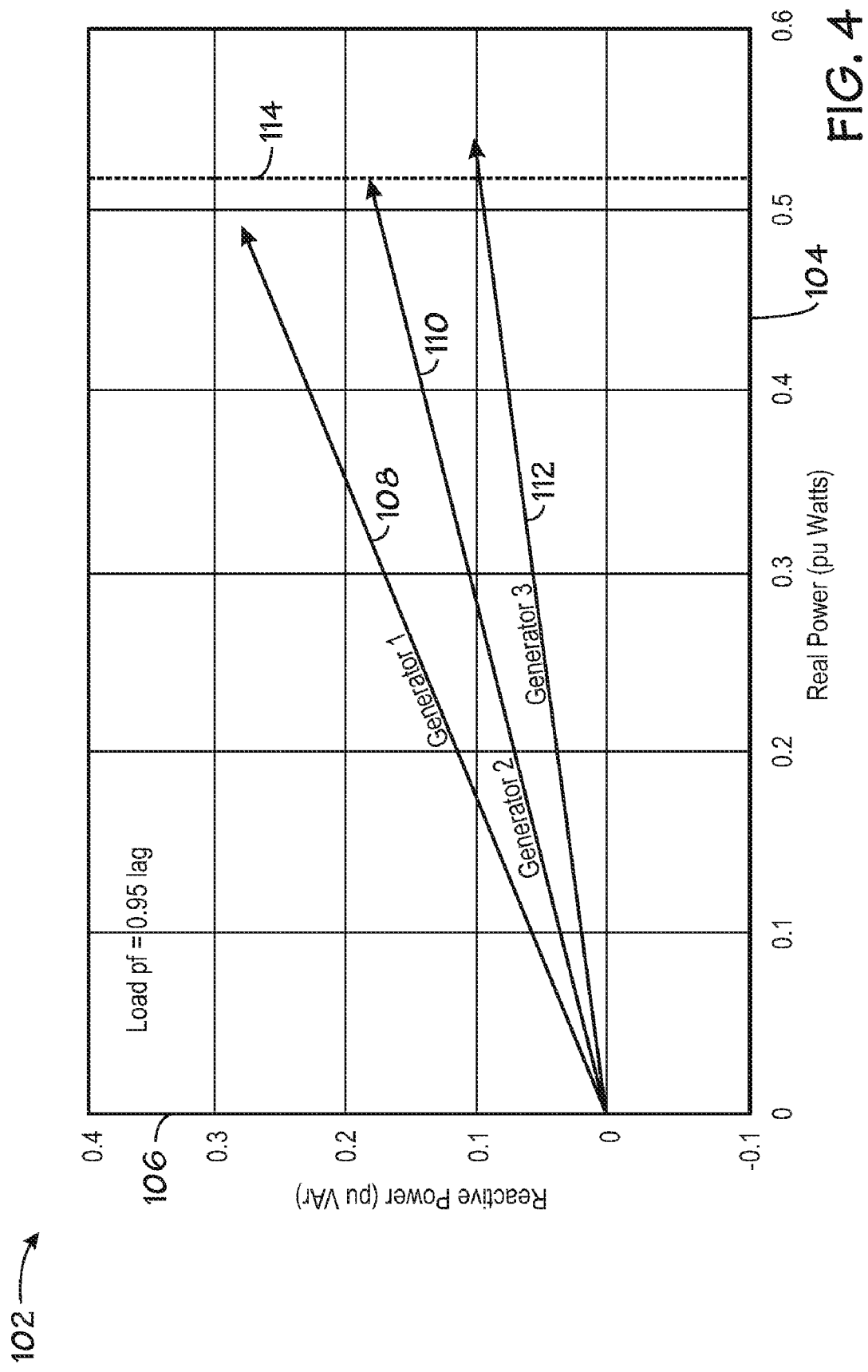
FIG. 4 is a graph illustrating exemplary apparent power output vectors of each of a plurality of generators.
Figure 5:
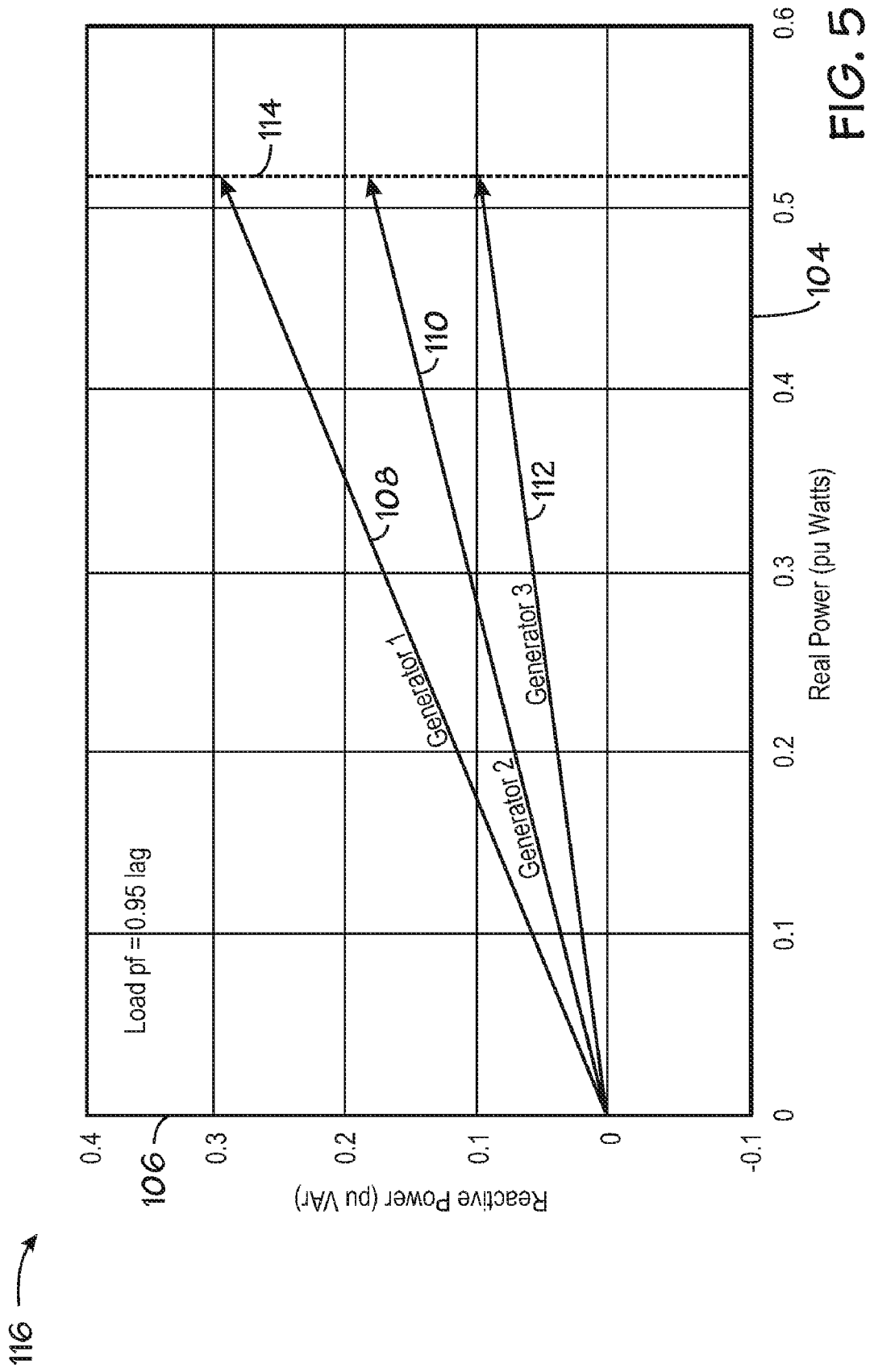
FIG. 5 is a graph depicting the balancing of real output power of the plurality of generators of FIG. 4 in accordance with certain aspects of the present technique.

As illustrated in graph 102 of FIG. 4, having axes 104 and 106, three exemplary generators may produce equal individual apparent output powers 108, 110, and 112. It will be noted that the present apparent output powers 108, 110, and 112 are based on a load lagging power factor of 0.95. One skilled in the art will appreciate that, holding the apparent power constant, decreasing the power factor increases the reactive power component and decreases the real power component of the generated power. In present case, with a relatively high power factor of 0.95, it may be desirable to balance the real power component of the power output by the generators, such as by equalizing the real power components of output powers 108, 110, and 112, at a level indicated by line 114. Such balancing may be achieved through the technique disclosed above. Particularly, an adjustment signal may be applied to Generator 1, such as via a field controller 40, to increase the apparent power 108 produced by the generator. Similarly, an adjustment signal may be applied to Generator 3 to reduce the apparent power 112 produced by this generator. Through use of such correction signals, the real power components of output powers 108, 110, 112 may be balanced, as provided in FIG. 5.

Notably, in other embodiments, balancing power may include operating one or more generators at one power output level, one or more generators at a second output level, or operating each generator at a different output level. Further, in these or other embodiments, one or more of the generators may be disconnected from the system and operated independently of the parallel generators, or deactivated, and correction signals may be applied to the remaining parallel generators to compensate for the power not being produced by the disconnected generators. As will be appreciated, this would allow one or more of the generators to power an independent load or be serviced without impacting the system as a whole, and also provides redundancy in case a generator unexpectedly fails.

Figure 6:
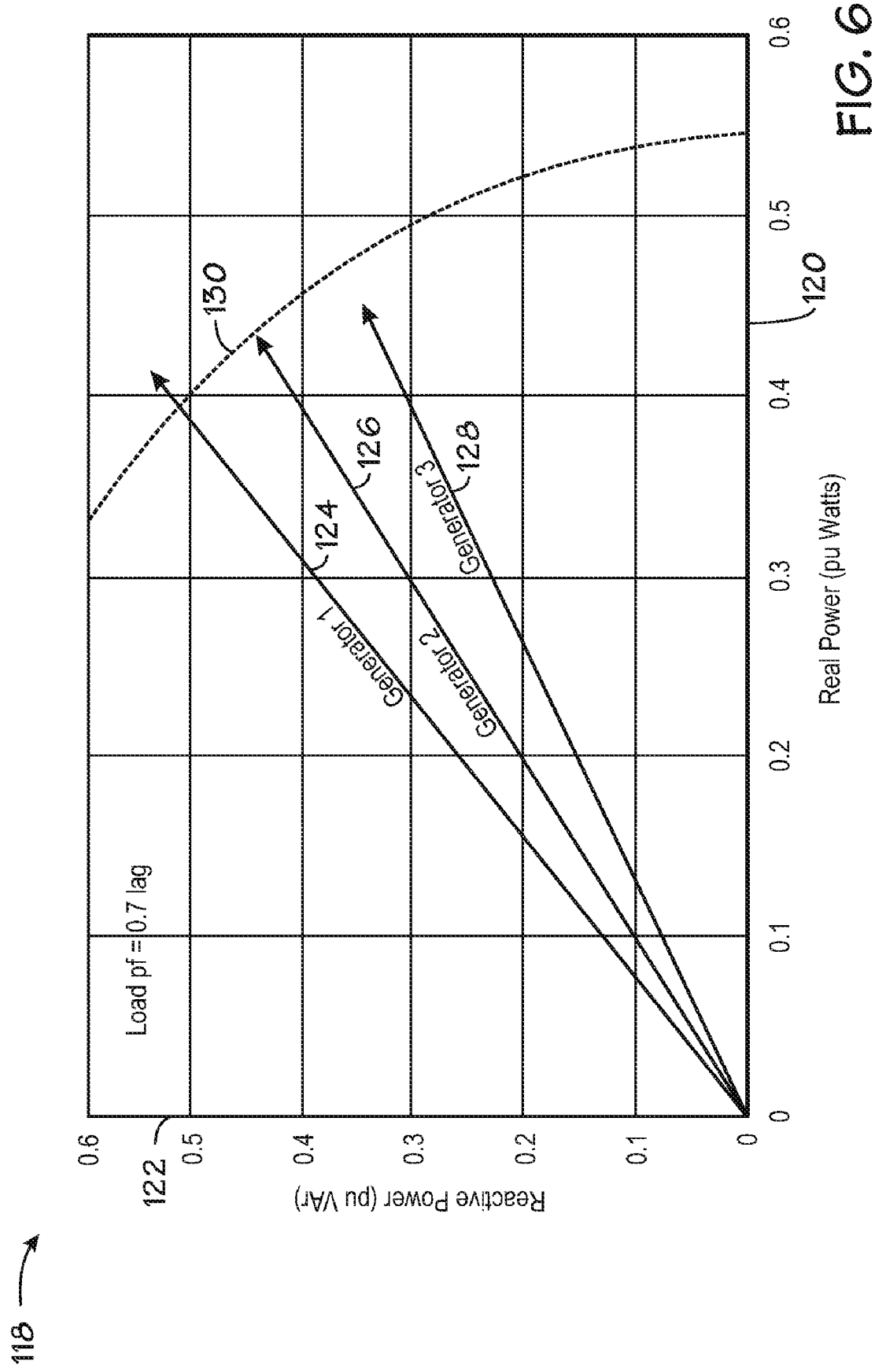
FIG. 6 is a graph illustrating alternative exemplary apparent power output vectors of several generators.
Figure 7:
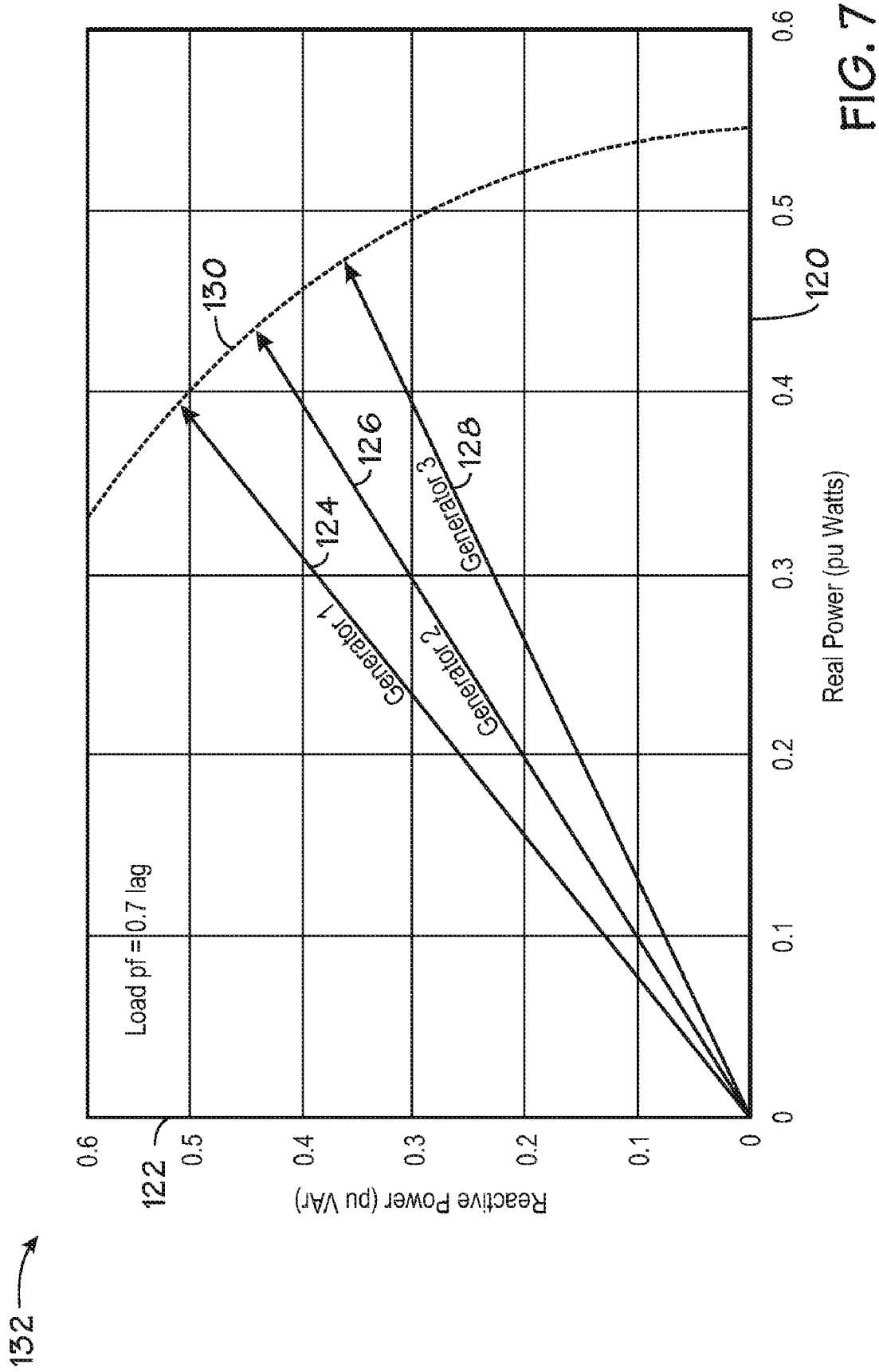
FIG. 7 is a graph depicting the balancing of apparent output power of the generators of FIG. 6 in accordance with certain aspects of the present technique.

If the power factor is reduced below a certain threshold, such as 0.80 or 0.85, it may be desirable to balance apparent output powers of several generators instead of balancing the real power components. For instance, FIG. 6 illustrates the apparent powers produced by several generators at a power factor 0.70. In graph 118, the real power is measured along horizontal axis 120 and the reactive power is measured along vertical axis 122. Generators 1, 2, and 3 produce apparent output powers 124, 126, and 128, respectively. In some applications, as noted above, it may be desirable to balance the magnitudes of output powers 124, 126, and 128, such as at a level represented by curve 130. Individual correction signals maybe applied to each of Generators 1, 2, and 3 to increase or decrease the apparent output power produced by these generators, as needed, to balance the magnitudes of these output powers along the curve 130, as provided in graph 132 of FIG. 7.

In still further applications it may be desirable to balance the reactive power components of output power generated by a plurality of generators instead of balancing either the apparent power or real power components. Such reactive power balancing may find particular application in those situations in which the power factor falls below a certain threshold, such as 0.25 or 0.50, in which the reactive power components are larger than in the instance of higher power factors. As in the examples above, individual control signals can be applied to each of a plurality of generators to adjust the output power produced by the generators and to balance the reactive power components thereof.

While the present technique may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

The invention claimed is:

1. A synchronous generator system comprising:
   a plurality of synchronous generators coupled to a common prime mover such that each synchronous generator of the plurality of synchronous generators receives mechanical power from the common prime mover;
   a control unit coupled to the plurality of synchronous generators, the control unit configured to compare an actual output power of each synchronous generator of the plurality of synchronous generators to a respective desired output power, and to provide respective correction signals to each synchronous generator, wherein the correction signals facilitate reduction of a difference between the actual output power and the desired output power for each synchronous generator and enable independent control of each synchronous generator, and wherein the correction signals facilitate reduction of the difference between the actual output power and the desired output power for each synchronous generator by facilitating an increasing of or a decreasing of the back EMF of respective exciters of the plurality of synchronous generators.

2. The system of claim 1, wherein the desired output power of at least one synchronous generator comprises the average output power of the plurality of synchronous generators.

3. The system of claim 2, wherein the desired output power of each synchronous generator comprises the average output power of the plurality of synchronous generators such that the control unit facilitates substantial equalization of the actual output powers of the plurality of synchronous generators.

4. The system of claim 1, wherein at least two synchronous generators of the plurality of synchronous generators have respective desired output powers different from one another.

5. The system of claim 1, comprising a mechanical power divider coupled to the common prime mover and the plurality of synchronous generators, wherein the mechanical power divider is configured to transmit mechanical power from the common prime mover to each synchronous generator of the plurality of synchronous generators.

6. The system of claim 1, wherein the control unit is configured to compare real powers, reactive powers, and/or apparent powers.

7. The system of claim 6, wherein the control unit is configured to compare real power of at least one of the synchronous generators to the average real power of the plurality of synchronous generators.

8. The system of claim 6, wherein the control unit is configured to compare reactive power of at least one of the synchronous generators to the average reactive power of the plurality of synchronous generators.

9. The system of claim 6, wherein the control unit is configured to compare apparent power of at least one of the synchronous generators to the average apparent power of the plurality of synchronous generators.

10. The system of claim 9, wherein the control unit is configured to compare real power of the at least one of the synchronous generators to the average real power of the plurality of synchronous generators.

11. The system of claim 10, wherein the control unit is configured to compare either real power or apparent power of the at least one of the synchronous generators to the average real power or average apparent power, respectively, of the plurality of synchronous generators depending upon a power factor threshold.

12. The system of claim 11, wherein the control unit is configured to compare real powers if a power factor of the system exceeds the power factor threshold and to compare apparent powers if the power factor is below the power factor threshold.

13. The system of claim 12, wherein the power factor threshold is substantially equal to 0.85.

14. The system of claim 12, wherein the power factor threshold is substantially equal to 0.80.

15. The system of claim 1, wherein the control unit is configured to provide the correction signals to field controllers of the plurality of synchronous generators.

16. A synchronous generator system comprising:
    a plurality of synchronous generators coupled to a common prime mover such that each synchronous generator of the plurality of synchronous generators receives mechanical power from the common prime mover;
    a control unit coupled to the plurality of synchronous generators, the control unit configured to compare an actual output power of each synchronous generator of the plurality of synchronous generators to a respective desired output power, and to provide respective correction signals to each synchronous generator, wherein the correction signals facilitate reduction of a difference between the actual output power and the desired output power for each synchronous generator and enable independent control of each synchronous generator, wherein the control unit is further configured: to compare either real power or apparent power of at least one of the synchronous generators to the average real power or average apparent power, respectively, of the plurality of synchronous generators depending upon a power factor threshold; to compare real powers if a power factor of the system exceeds the power factor threshold; and to compare apparent powers if the power factor is below the power factor threshold.

17. The system of claim 16, wherein the power factor threshold is substantially equal to 0.85.

18. The system of claim 16, wherein the power factor threshold is substantially equal to 0.80.

* * * * *